(No Model.)
W. H. BAYLEY.
WHIFFLETREE FASTENING.
No. 591,727. Patented Oct. 12, 1897.
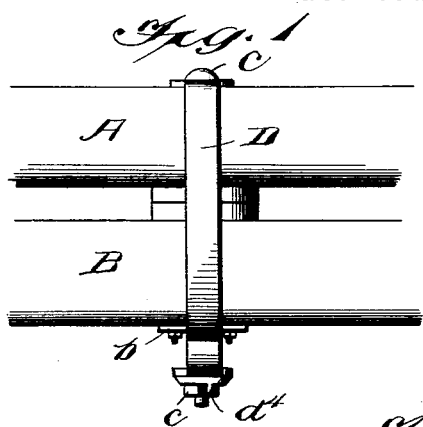
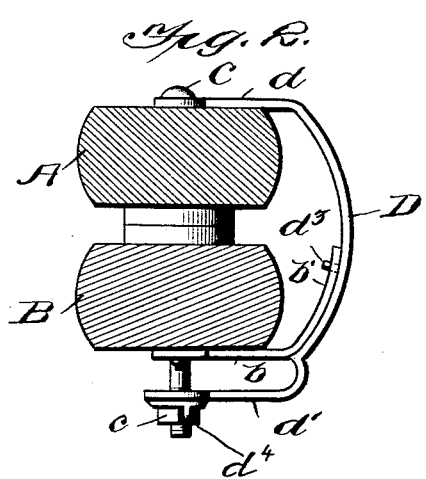
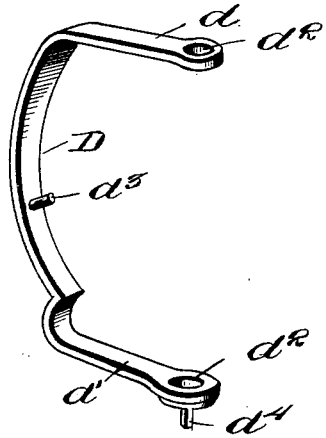
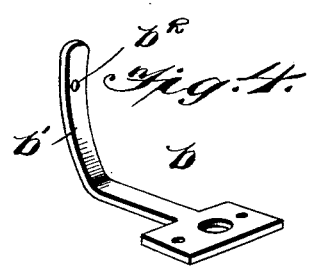
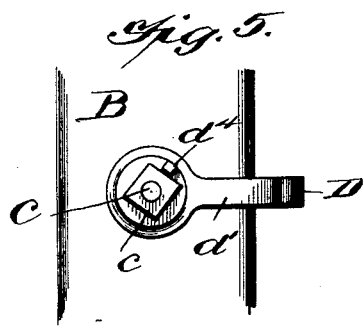
WITNESSES
W. J. Koerth
Paca Oberlin
INVENTOR
Walter H. Bayley,
by John Wedderburn
Attorney

UNITED STATES PATENT OFFICE.

WALTER H. BAYLEY, OF PEACHAM, VERMONT.

WHIFFLETREE-FASTENING.

SPECIFICATION forming part of Letters Patent No. 591,727, dated October 12, 1897.

Application filed November 18, 1896. Serial No. 612,602. (No model.)

*To all whom it may concern:*

Be it known that I, WALTER H. BAYLEY, a citizen of the United States, residing at Peacham, in the county of Caledonia and State of Vermont, have invented certain new and useful Improvements in Whiffletree-Fastenings; and I do hereby declare the following to be a full, clear, and exact description of the invention, such as will enable others skilled in the art to which it appertains to make and use the same.

My invention relates to a fastening for whiffletrees and the like, my object being to provide a construction by which the rattling of the whiffletree is prevented, and also to so construct and arrange the parts that the nut upon the pivot-bolt of the whiffletree cannot work loose.

To these ends the invention consists in the various matters hereinafter described and claimed.

In the accompanying drawings, which illustrate the invention, Figure 1 is a rear view of a cross-bar and whiffletree with the present attachment applied. Fig. 2 is a side view thereof. Fig. 3 is a perspective of the spring detached. Fig. 4 is a perspective of the lower plate and the bar by which the spring is supported. Fig. 5 is a bottom plan view showing the relation of the nut to the spring for preventing the nut from being lost.

Referring now more particularly to the drawings, A represents a whiffletree or similar member of any suitable construction, and B a cross-bar. The usual bolt C extends through the whiffletree and cross-bar to pivot the whiffletree upon the bar.

The present attachment comprises a spring D, having arms $d$ and $d'$ extending therefrom, said arms being provided with openings $d^2$ for the passage of the bolt by which the whiffletree is pivoted. The plate $b$ of the cross-bar has an arm $b'$ extending therefrom, said arm being provided in its end with an opening $b^2$, adapted to receive a lug $d^3$ on the inner face of the curved part of the spring D. It will thus be seen that if the spring has its ends upon a bolt, as shown, and is held in place by the arm $b'$ the tendency of the spring is to draw the bolt closely against the rear side of the openings through the whiffletree and the cross-bar, thus holding the parts securely together and preventing the rattling common to vehicles in which the bolt is worn to some extent.

The nut $c$ is applied below the arm $d'$ of the spring and is screwed up closely to said arm. A lug $d^4$ is provided upon the lower side of the arm $d'$, so that when the nut has been screwed home the rib lies along one side of the same and thus prevents the nut from turning. Of course to screw the nut up the required distance the arm $d'$ can be pressed out of the way, and after the nut has reached its proper position the arm is permitted to fall.

The present device has been described and will be claimed as upon a whiffletree, but it is to be fully understood that I do not desire to be limited to the use upon a "whiffletree," the term having been used only because of convenience.

It will be clearly seen that the device can be as well used upon doubletrees and the like as upon whiffletrees.

Having thus described my invention, what I claim as new, and desire to secure by Letters Patent, is—

1. The combination with a cross-bar, a whiffletree, and a bolt through said cross-bar and whiffletree, of a plate carried by the cross-bar, a brace-arm having an opening therethrough projecting from said plate, a plate having a lug thereon engaging the opening in the brace-arm, and spring-arms extending from said plate, said spring-arms engaging the said bolt, substantially as described.

2. The combination with a cross-bar, a whiffletree, and a bolt through the cross-bar and the whiffletree, of a plate upon the cross-bar, a brace-arm extending from said plate, said brace-arm being provided with an opening, a yoke of spring material having a lug thereon engaging the opening in the brace-arm, the said yoke having arms provided with openings through which the said bolt passes, substantially as described.

In testimony whereof I have signed this specification in the presence of two subscribing witnesses.

WALTER H. BAYLEY.

Witnesses:
W. H. BURBANK,
A. L. GUTHRIE.